Patented Nov. 16, 1937

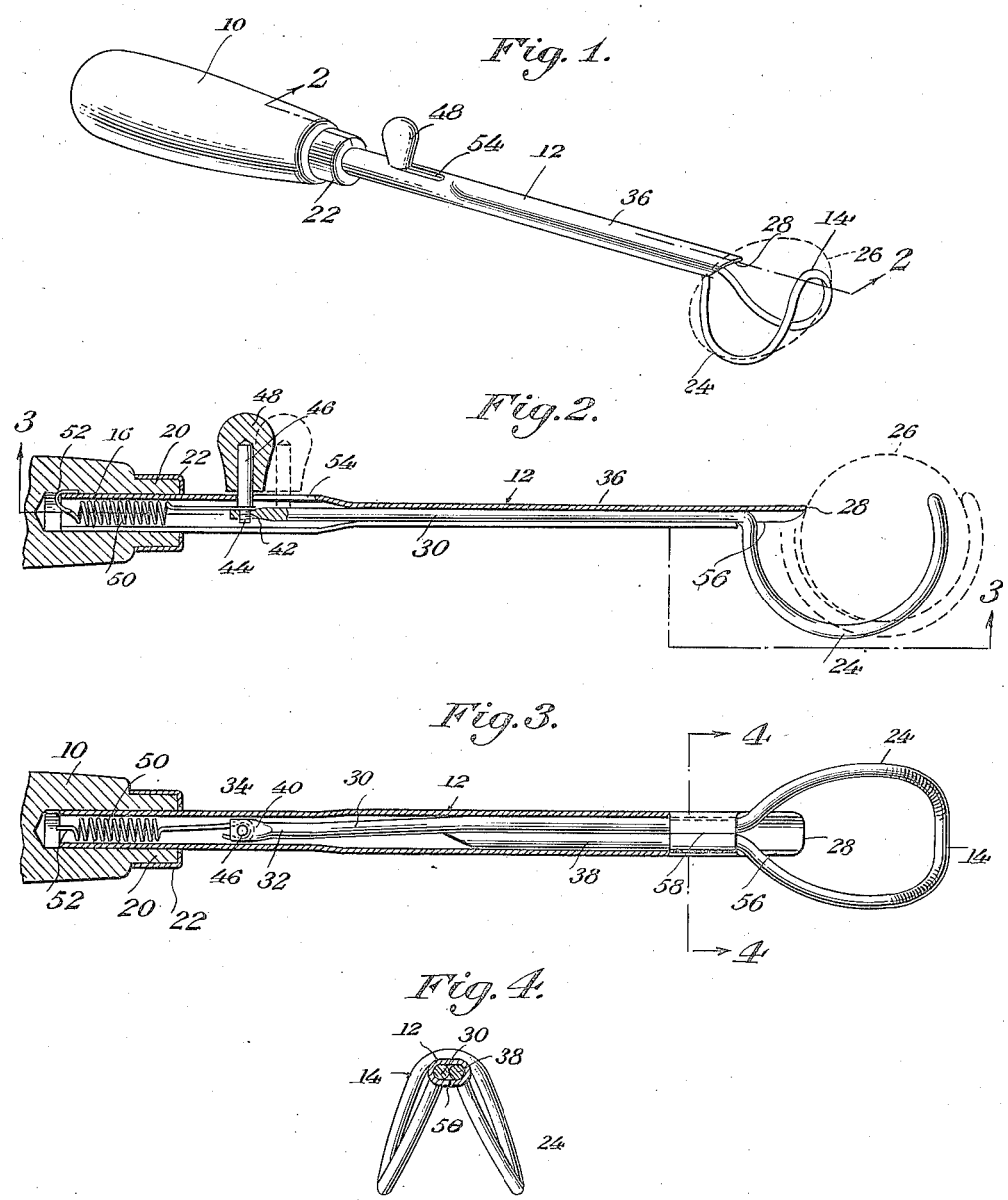

2,099,588

UNITED STATES PATENT OFFICE 2,099,588

EGG HANDLING TOOL

Norman J. Annema, Grand Rapids, Mich.

Application April 20, 1936, Serial No. 75,462

6 Claims. (Cl. 294—103)

My invention relates to eggs, and has among its objects and advantages the provision of an improved egg handling tool.

In the accompanying drawing:

Fig. 1 is an operative view of my invention;

Fig. 2 is a sectional view along the line 2—2 of Fig. 1;

Fig. 3 is a sectional view along the line 3—3 of Fig. 2; and

Fig. 4 is a sectional view along the line 4—4 of Fig. 3.

In the embodiment selected to illustrate my invention, I make use of a handle 10, carrying a tubular shank 12 having an egg-gripping element 14 associated therewith. In Fig. 2, the handle includes a bore 16 for the reception of the shank 12. I provide the handle 10 with a neck 20 upon which a ferrule 22 is driven.

The element 14 comprises a single piece of wire bent to provide a loop 24, which loop is curved when viewed according to Fig. 2. The curvature is shaped to receive an egg 26, which egg is pulled into abutting relation with the end 28 of the shank 12. The ends of the wire from which the loop 24 is shaped are slidably mounted within the shank 12. The longer end 30 of the wire is bent to position its reach 32 centrally of the circular reach 34 of the tubular shank 12. The greater portion of the tubular shank 12 is flattened, as indicated at 36, to snugly embrace the two reaches 30 and 38 of the wire.

In Figs. 2 and 3, I illustrate the reach 32 as being flattened at 40 and provided with a threaded opening 42 for the reception of the threaded end 44 of a pin 46 upon which a knob 48 is mounted. One end of a spring 50 is looped about the threaded end 44, and its opposite end is bent at 52 and hooked over the end of the tubular shank. I slot the tubular shank 12 at 54 to accommodate the pin 46.

In gripping an egg, the knob 48 is pushed toward the end 28 of the shank against the tension of the spring 50. After the egg has been positioned within the element 14, the knob 48 is released, at which time the spring 50 causes the egg to be firmly pinched between the element 14 and the end 28. The element 14 embodies sufficient depth to embrace the egg throughout more than 180°, and the end 28 is shaped so as to press the egg firmly within the element 14. Because of the pressure applied to the egg, the curvature of the element 14, and the wide nature of the loop 24, the egg is effectively gripped. The knob 48 is arranged in close relation with the handle 10 so that the device may be handled and manipulated with one hand. The egg is gripped with sufficient force to permit the device to be held in any position.

A part of the tubular shank 12 is cut away at 56 to accommodate the element 14. In Fig. 4, I indicate the tubular shank 12 as being slit at 58. The shank may originally comprise a blanket of sheet metal bent about reaches 30 and 38 of the wire. The flattened reach 36 of the shank restrains the element 14 from rotation about the longitudinal axis of the shank 12.

Without further elaboration the foregoing will so fully explain my invention that others may, by applying current knowledge, readily adapt the same for use under various conditions of service.

I claim:

1. An egg handling tool comprising a handle, a tubular shank carried thereby, an egg-gripping element having a part slidably arranged within the shank, and another part positioned exteriorly thereof and cooperating with one end of the shank for gripping an egg.

2. An egg handling tool comprising a handle, a tubular shank carried thereby, an egg-gripping element having a part slidably arranged within the shank, another part positioned exteriorly thereof and cooperating with one end of the shank for gripping an egg, and means cooperating between the shank and the egg holding element for holding said last named part in egg-gripping relation with said one end of the shank.

3. An egg handling tool comprising a handle, a tubular shank carried thereby, an egg-gripping element having a part slidably arranged within the shank, another part positioned exteriorly thereof and cooperating with one end of the shank for gripping an egg, means cooperating between the shank and the egg holding element for holding said last named part in egg-gripping relation with said one end of the shank, and means connected with said egg-gripping element and arranged in operative relation with said handle for shifting the egg-gripping element, to release the egg.

4. An egg handling tool comprising a handle, a tubular shank carried thereby, said tubular shank having a flattened reach, an egg-gripping element having a shank slidably positioned within said flattened reach, said egg-gripping element cooperating with one end of the tubular shank for gripping an egg, said tubular shank being slotted, a spring having one end connected with the tubular shank and the other end connected with the shank of the egg-gripping element for holding the latter in egg-gripping relation with the said one end of the shank, and means connected with the shank of the egg-gripping element and projected through said slot, to permit shifting of the egg-gripping element against the tension of said spring.

5. An egg handling tool comprising a handle having a tubular shank connected therewith, an egg-gripping element having a reach slidably positioned within the said shank, said egg-gripping element cooperating with one end of the shank for gripping an egg, the said one end of shank being shaped to permit a portion of the egg-gripping element to be shifted to a position inwardly of the said one end, and manually operated means for shifting the egg-gripping element.

6. An egg handling tool comprising a tube, an egg gripping element in the nature of a loop having a shank slidably mounted within the tube, said loop being shaped to partly embrace an egg and so positioned as to hold the egg in abutting relation with one end of the tube, and resilient means co-operable on said tube and the shank for pulling the shank inwardly of the tube to pinch an egg between the loop and the said one end of the tube.

NORMAN J. ANNEMA.